(12) United States Patent
Green et al.

(10) Patent No.: US 12,137,623 B2
(45) Date of Patent: Nov. 12, 2024

(54) AGRICULTURAL WORK VEHICLE

(71) Applicant: Agro Intelligence ApS, Aarhus N (DK)

(72) Inventors: Ole Green, Lem (DK); Jacob Pilegaard Juul, Skanderborg (DK); Liubava Znova, Tilst (DK); Claus Dühring Jæger, Skanderborg (DK)

(73) Assignee: Agro Intelligence ApS, Aarhus N (DK)

( * ) Notice: Subject to any disclaimer, the term of this patent is extended or adjusted under 35 U.S.C. 154(b) by 720 days.

(21) Appl. No.: 17/297,446

(22) PCT Filed: Nov. 15, 2019

(86) PCT No.: PCT/DK2019/050353
§ 371 (c)(1),
(2) Date: May 26, 2021

(87) PCT Pub. No.: WO2020/108712
PCT Pub. Date: Jun. 4, 2020

(65) Prior Publication Data
US 2022/0015279 A1    Jan. 20, 2022

(30) Foreign Application Priority Data

Nov. 27, 2018  (DK) .......................... PA 2018 00917

(51) Int. Cl.
*A01B 63/16*      (2006.01)
*A01B 51/02*      (2006.01)
(Continued)

(52) U.S. Cl.
CPC .......... *A01B 51/023* (2013.01); *A01B 69/008* (2013.01); *A01B 79/005* (2013.01)

(58) Field of Classification Search
CPC ..... A01B 51/023; A01B 63/16; A01B 69/007; A01B 69/008; B60G 5/025
See application file for complete search history.

(56) References Cited

U.S. PATENT DOCUMENTS 2,484,280 A   10/1949 Fuston
3,716,105 A    2/1973 Hallam
(Continued)

FOREIGN PATENT DOCUMENTS

DE   102017007265 A1 *  2/2019  ............. A01B 51/02
EP      1118719 A3       4/2002
(Continued)

OTHER PUBLICATIONS

Anonymous, "Robotti—University of Southern Denmark, SDU," Sep. 22, 2017, XP055670125, Retrieved from the Internet: <https://www.sdu.dk/en/om_sdu/fakulteterne/teknik/nyt_fra_det_tekniske_fakultet/robotti>. Accessed on the Internet May 25, 2021.
(Continued)

*Primary Examiner* — Barry Gooden, Jr.
(74) *Attorney, Agent, or Firm* — Krishna Kalidindi

(57) ABSTRACT

The invention relates to an agricultural work vehicle (100) for performing an agricultural work operation in an agricultural field, wherein said work vehicle comprises:
  a first drive module (2):
  a second drive module (4),
  a connecting element (6); said connecting element comprises a first axial end (8) and a second axial end (10);
  propulsion means (12) for propelling said work vehicle;
  steering means (14) for steering said work vehicle;
  a control unit (16) for controlling the operation of said work vehicle;
wherein said first drive module (2) comprises a first chassis (18);
wherein said second drive module (4) comprises a second chassis (20);
wherein said first drive module (2) comprises drive means (90) for allowing said first drive module to move over ground, said drive means (90) being suspended on said first chassis (18);

(Continued)

wherein said second drive module comprises drive means (92) for allowing said second drive module to move over ground, said drive means (92) being suspended on said second chassis (20);

wherein said first axial end (8) of said connecting element (6) is being attached to said first chassis (18); and wherein said second axial end (10) of said connecting element (6) is being connected to said second chassis (20);

wherein said work vehicle is comprising pivoting means (26), thereby allowing that the orientation of said first drive module (2) is being able to rotate in relation to the orientation of said second drive module (4), around an axis being essentially parallel to a longitudinal direction of said connecting element (6).

20 Claims, 9 Drawing Sheets

(51) Int. Cl.
  *A01B 69/04* (2006.01)
  *A01B 79/00* (2006.01)
  *B60G 5/00* (2006.01)

(56) References Cited

U.S. PATENT DOCUMENTS

| | | | | |
|---|---|---|---|---|
| 4,090,723 | A | 5/1978 | Hart | |
| 5,193,632 | A * | 3/1993 | Clar | B25J 5/005 |
| | | | | 180/9.1 |
| 5,297,644 | A * | 3/1994 | Clar | B62D 55/116 |
| | | | | 180/9.46 |
| 5,335,739 | A | 8/1994 | Pieterse et al. | |
| 11,547,035 | B1 * | 1/2023 | Boe | A01B 59/066 |
| 11,707,957 | B2 * | 7/2023 | Vondráček | B60G 5/025 |
| | | | | 280/124.11 |
| 2015/0083504 | A1 * | 3/2015 | Pohjoisaho | B62D 61/12 |
| | | | | 180/9.5 |
| 2015/0084301 | A1 * | 3/2015 | Johnson | B60G 5/025 |
| | | | | 280/124.112 |
| 2018/0092286 | A1 * | 4/2018 | Anderson | A01B 63/16 |
| 2021/0323616 | A1 * | 10/2021 | Fliearman | B60B 11/02 |
| 2022/0007561 | A1 * | 1/2022 | Juul | A01B 75/00 |
| 2022/0142140 | A1 * | 5/2022 | Wakuta | B62D 55/06 |

FOREIGN PATENT DOCUMENTS

| | | | | |
|---|---|---|---|---|
| EP | 3318430 A1 * | 5/2018 | | B60G 3/01 |
| WO | WO-9007866 A2 * | 7/1990 | | A01B 51/023 |
| WO | WO-0123241 A2 * | 4/2001 | | A01B 51/023 |
| WO | 2020108712 A1 | 6/2020 | | |

OTHER PUBLICATIONS

Anonymous, "Autonomous robots to revolutionise agriculture | Shaping Europe's digital future," Nov. 14, 2017, XP055670124. Retrieved from the Internet: <https://digital-strategy.ec.europa.eu/en/news/autonomous-robots-revolutionise-agriculture>. Accessed on the Internet May 25, 2021.

International Patent Application No. PCT/DK2019/050353, "International Search Report and Written Opinion" mailed Feb. 27, 2020, 9 pages.

* cited by examiner

AGRICULTURAL WORK VEHICLE

CROSS-REFERENCE TO RELATED APPLICATIONS

This application is a U.S. National State of International Application No. PCT/DK2019/050353, filed on Nov. 15, 2019, which is hereby incorporated by reference in its entirety.

FIELD OF THE INVENTION

The present invention relates in general to the field of agriculture. More specifically the present invention relates in a first aspect to an agricultural work vehicle for performing an agricultural work operation. In a second aspect the present invention relates to a use of an agricultural work vehicle according to the first aspect for performing an agricultural work operation.

BACKGROUND OF THE INVENTION

Within the field of agriculture it has traditionally been common practice to provide auxiliary power when performing agricultural work, such as during tillage. Such auxiliary power had for centuries been provided by relatively large animals, such as cattle, horses, donkeys etc.

During the 1940s and the 1950s the use of tractors for aiding soil working became very popular and tractors eventually outperformed the use of towing animals.

Tractors provide many benefits compared to use of work animals. These benefits comprise inter alia increased power, no exhaustion during prolonged working periods, full obedience to the operator's instructions etc.

Because tractors are manually operated, thus needing an operator during use thereof, it makes sense that tractors are designed with the current relatively large size. The rationale is: because a tractor needs a human operator, tractors might just as well be designed in a size that allows working a relative large width of agricultural soil, thereby reducing the time needed for human intervention. Hence, it is not uncommon that currently produced tractors are having sizes that allows for working the agricultural field in a width of 1-50 meters or more.

Although the rather large sizes of currently produced tractors provide for efficient working of an agricultural field, these tractors nevertheless present a number of disadvantages.

One of these disadvantages is that the large size of these tractors and the accompanying high weight imposes a not insignificantly soil compaction. Any soil compaction is undesirable because it prevents optimal growth conditions of crops growing in the soil or to crops to be sown in the soil.

The larger the machines becomes, the more difficult it is for the human operator to apply the needed attention to the individual square meter of the field. Hence the fields therefore are being managed more according to a plan and not to the site-specific conditions and needs.

With the recent advances of robot technology, autonomous agricultural work vehicles (or autonomous agricultural robots) have been developed. Such autonomous agricultural work vehicles may be able to perform tillaging operations, spraying operations, seeding operations, weeding operations and other types of agricultural operations.

Additionally, such robots are particularly well suited for performing sensor based surveying of an agricultural field with the view to gain information of the general state of such field, the soil and its crops.

These agricultural robots may be programmed to follow a predetermined path in the agricultural filed upon working it, but can also be equipped with a system for adaptive route planning for in-field optimization of the specific operation, thereby avoiding the necessity of human intervention during its operation.

As such robots are autonomous and therefore does not require human operation during the working thereof, it is not a decisive factor to design the robots in a size that has the same working capacity as the currently available tractors in order to maintain a competitive cost-efficient operation.

One type of an agricultural robot has been manufactured and marketed by the proprietor of the present application, under the trade name "Robotti".

Robotti comprises two drive modules with wheels, arranged sideways relative to the direction of movement. Each of the two drive modules are rigidly fixed to opposite ends of a front bar having a fixed axial length. On the front bar, between the two drive modules, is arranged a three-point linkage which allows an agricultural implement to be coupled to the front bar of Robotti.

Each drive module comprises two broad wheels arranged behind one another. Each wheel comprises a hub including a hydraulic drive. One or both of the drive module comprises a diesel engine coupled to a hydraulic pump which provides pressurized hydraulic fluid to be supplied to the hydraulic drives of the wheels.

A control system provides for controlling Robotti. The control system is being configured to control the movement of Robotti according to the operational specifications to be followed.

With its relative low weight, Robotti and its broad wheels and tires, Robotti imparts considerably less soil compaction to the soil, compared to the situation encountered by conventional tractors.

However, although Robotti represents huge advances in the field of agriculture, this robot nevertheless leaves room for improvement.

It has been found that because each drive module is rigidly fixed to the front bar connecting these, the bottom point in respect of each wheel defines a plane and because of this it may in rough terrain happen that Robotti may not be able to constantly have all four wheels touching the ground. Accordingly, in rough terrain, Robotti may be brought into a situation in which a single wheel is not touching the ground. This obviously implies reduced traction of the robot, reduced steering ability of the robot and an increased soil compaction imposed by those three wheels which actually do touch the ground.

Accordingly, a need exists for an improved autonomous agricultural work vehicle which overcomes the above identified disadvantages.

It is an objective of the present invention to provide an improved agricultural work vehicle which overcomes the above listed disadvantages.

BRIEF DESCRIPTION OF THE INVENTION

This objective is fulfilled according to the first and the second aspect of the present invention.

Accordingly, the first aspect of the present invention relates to an agricultural work vehicle for performing an agricultural work operation in an agricultural field, wherein said work vehicle comprises:
 a first drive module;
 a second drive module;

a connecting element; said connecting element comprises a first axial end and a second axial end;
propulsion means for propelling said work vehicle;
steering means for steering said work vehicle;
a control unit for controlling the operation of said work vehicle;
wherein said first drive module comprises a first chassis;
wherein said second drive module comprises a second chassis;
wherein said first drive module comprises drive means for allowing said first drive module to move over ground, said drive means being suspended on said first chassis;
wherein said second drive module comprises drive means for allowing said second drive module to move over ground, said drive means being suspended on said second chassis;
wherein said first axial end of said connecting element is being attached to said first chassis; and wherein said second axial end of said connecting element is being connected to said second chassis;
wherein said work vehicle is comprising pivoting means, thereby allowing that the orientation of said first drive module is being able to rotate in relation to the orientation of said second drive module, around an axis being essentially parallel to a longitudinal direction of said connecting element.

In a second aspect the present invention relates to the use of an agricultural work vehicle according to the first aspect for performing an agricultural work operation.

The present invention in its various aspects provides for improved traction of the wheels of an agricultural work vehicle due to the achieved effect that the orientation of a first drive module is able to pivot or rotate in relation to a second drive module. Hereby it is assured that two wheels of each drive module will always be in contact with the ground, irrespective of the topography of the ground.

The achieved effect moreover ensures that as four wheels are always in contact with the ground, reduced soil compaction will result.

BRIEF DESCRIPTION OF THE FIGURES

FIG. 2b is a top view illustrating the inventive autonomous agricultural work vehicle shown in FIG. 2a.

FIG. 2c is a front view illustrating the inventive autonomous agricultural work vehicle shown in FIG. 2a.

FIG. 2d is a cross-sectional view inventive autonomous agricultural work vehicle shown in FIG. 2a.

DETAILED DESCRIPTION OF THE INVENTION

Figure 1:
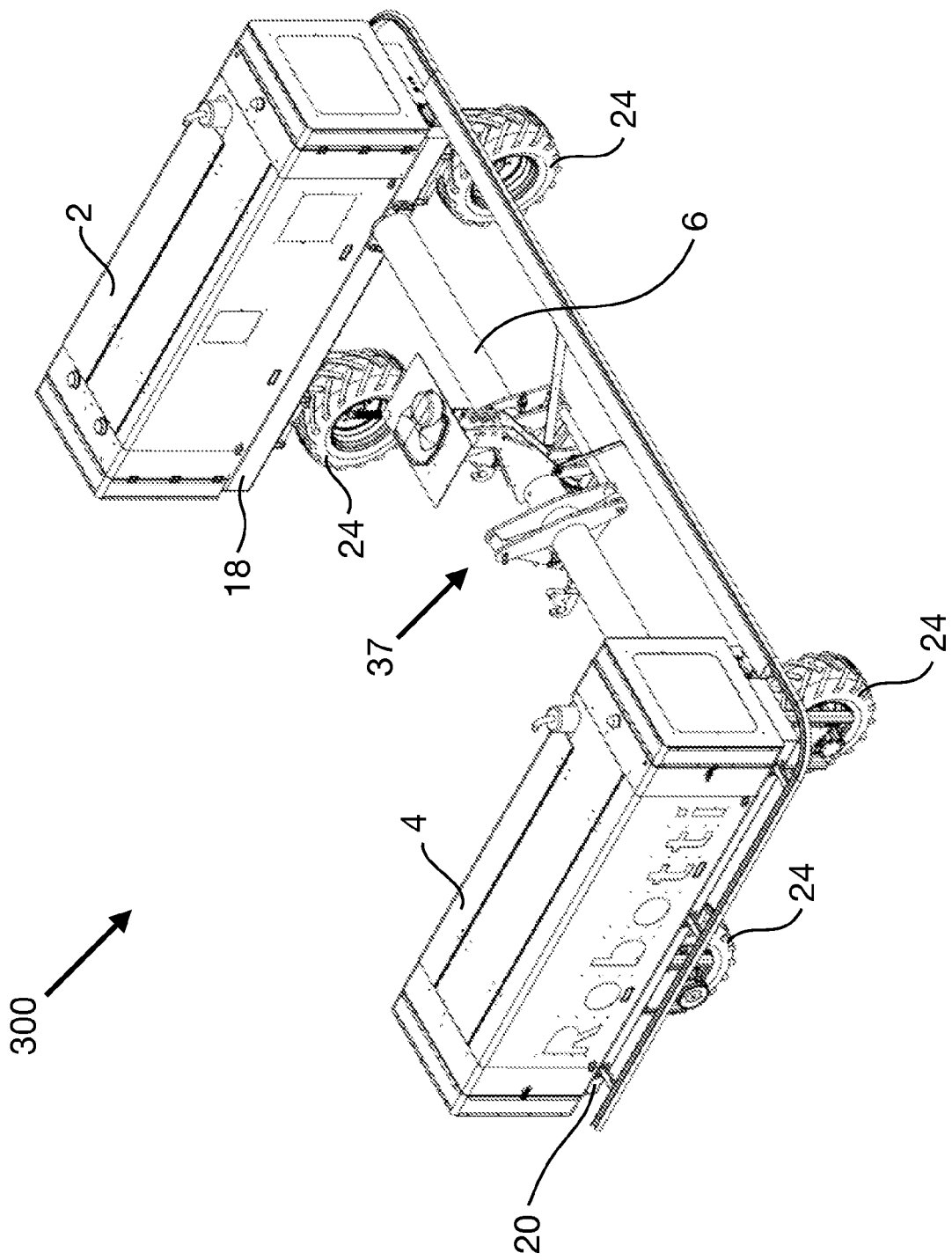
FIG. 1 is a perspective view illustrating an autonomous agricultural work vehicle according to the prior art.

The First Aspect of the Present Invention

The first aspect of the present invention relates to an agricultural work vehicle for performing an agricultural work operation in an agricultural field, wherein said work vehicle comprises:
a first drive module;
a second drive module;
a connecting element; said connecting element comprises a first axial end and a second axial end;
propulsion means for propelling said work vehicle;
steering means for steering said work vehicle;
a control unit for controlling the operation of said work vehicle;
wherein said first drive module comprises a first chassis;
wherein said second drive module comprises a second chassis;
wherein said first drive module comprises drive means for allowing said first drive module to move over ground, said drive means being suspended on said first chassis;
wherein said second drive module comprises drive means for allowing said second drive module to move over ground, said drive means being suspended on said second chassis;
wherein said first axial end of said connecting element is being attached to said first chassis; and wherein said second axial end of said connecting element is being connected to said second chassis;
wherein said work vehicle is comprising pivoting means, thereby allowing that the orientation of said first drive module is being able to rotate in relation to the orientation of said second drive module, around an axis being essentially parallel to a longitudinal direction of said connecting element.

Accordingly, providing the pivoting means allows the two drive module to pivot in relation to each other thereby ensuring each drive means of each drive module always to be in contact with the ground, irrespective (within certain limits) of the topography of the ground of the agricultural field.

In an embodiment of the agricultural work vehicle according to the first aspect of the present invention the agricultural work vehicle is being a remotely controlled work vehicle and/or an autonomous work vehicle and/or a semi-autonomous work vehicle.

Hereby is achieved that the agricultural operation can be performed remotely controlled, autonomous or semi-autonomous. In the present description and in the appended claims a semi-autonomous mode shall be construed to mean an autonomous mode in which an operator may overrule autonomy by remotely providing remote and manual operational instructions during its autonomous operation.

In an embodiment of the agricultural work vehicle according to the first aspect of the present invention propulsion means comprises one or more electric motors or one or more hydraulic drives or one or more mechanical drives for driving said drive means.

These types of propelling the work vehicle have proven beneficial.

In an embodiment of the agricultural work vehicle according to the first aspect of the present invention the drive means each comprises two or more sets of wheels, wherein all wheels in a specific set of wheels are sharing a common axis of rotation; or wherein said drive means each comprises one or two or more caterpillar belts.

Wheels and caterpillar belts have proved simple and cost efficient way of propelling the agricultural work vehicle.

In an embodiment of the agricultural work vehicle according to the first aspect of the present invention the drive means each comprises two sets of wheels, said sets of wheels being arranged behind each other, as seen relative to a non-turning direction of movement of said vehicle.

Providing each drive module with two sets of wheels allows for a simple design which, by virtue of the pivoting means, will be able to provide for wheel contact with the ground of all four sets of wheels, irrespective of the topography of the ground.

In an embodiment of the agricultural work vehicle according to the first aspect of the present invention the set of wheels, in respect of a specific set of wheels, comprises one, two, three, or four or more wheels.

In an embodiment of the agricultural work vehicle according to the first aspect of the present invention the drive means comprises one, two, three, or four or more caterpillar belts, optionally being arranged sideways to each other and/or behind each other.

In an embodiment of the agricultural work vehicle according to the first aspect of the present invention the propulsion means are configured for driving one or two sets of wheels and/or caterpillar belts of each drive module.

In an embodiment of the agricultural work vehicle according to the first aspect of the present invention the propulsion means comprises hydraulic drives for driving said drive means and the agricultural work vehicle comprises one or more hydraulic pumps for driving said hydraulic drives, and the agricultural work vehicle furthermore comprises a motor for driving the hydraulic pump, such as an electric motor; or a combustion engine, such as a petrol engine or a diesel engine, or a biogas engine.

In an embodiment of the agricultural work vehicle according to the first aspect of the present invention the propulsion means comprises an electric motor for driving said drive means.

In an embodiment of the agricultural work vehicle according to the first aspect of the present invention the propulsion means comprises mechanical means for driving said drive means.

In these three embodiments the agricultural work vehicle may be propelled using hydraulic, electric or mechanic technology.

In an embodiment of the agricultural work vehicle according to the first aspect of the present invention one or more of said wheels independently is/are having an outer diameter of 25-300 cm, such as 30-275 cm, for example 35-250 cm, such as 40-225 cm, e.g. 45-200 cm, such as 50-175 cm, e.g. 55-150 cm, such as 60-125 cm, e.g. 65-100 cm, such as 70-95 cm, such as 75-90 cm, e.g. 80-85 cm.

In some environments it is preferably to provide the agricultural work vehicle with wheels having a relatively large diameter and in other environments it is preferably to the agricultural work vehicle with smaller wheels. The above ranges cover most situations.

In an embodiment of the agricultural work vehicle according to the first aspect of the present invention at least one set of wheels of each drive module is being pivotally suspended in a wheel base on its corresponding chassis in such a way that the pitch of the rotational plane of said one or more wheels of said set of wheels can be altered, relative to a fixed geographical direction, and wherein said steering means comprises actuation means for altering said pitch.

This design provides for a reliable mode of steering the agricultural work vehicle. In an embodiment of the agricultural work vehicle according to the first aspect of the present invention the steering means comprises means for allowing propelled wheels of one drive module to rotate at a rotational speed which is different from the rotational speed of the propelled wheels of the other drive module.

This design provides for another reliable mode of steering the agricultural work vehicle. In certain embodiments the above two steering modes may be combined. In an embodiment the above two steering modes may be combined.

In an embodiment of the agricultural work vehicle according to the first aspect of the present invention the shortest distance from the center of a wheel of one drive module to the center of a wheel of the other drive module is selected from the range of 20-4000 cm, such as 30-3500 cm, e.g. 40-3000 cm, such as 50-2500 cm, for example 60-2000 cm, e.g. 70-1800 cm, such as 80-1700 cm, e.g. 90-1600 cm, for example 100-1500 cm, e.g. 150-1400 cm, e.g. 200-1300 cm, such as 250-1200 cm, such as 300-1100 cm, such as 350-1000 cm, such as 400-900 cm, such as 500-800 cm, e.g. 600-700 cm.

The above widths of the agricultural work vehicle have proven appropriate for the intended purpose of performing an agricultural operation.

In an embodiment of the agricultural work vehicle according to the first aspect of the present invention the work vehicle further is comprising an energy storage or energy provider, such as a fuel tank or a battery; or one or more solar panels; or one or more fuel cell modules in combination with a fuel gas tank, such as a hydrogen tank or a methane tank.

These energy sources have proven beneficial for a work vehicle according to the first aspect of the invention.

In an embodiment of the agricultural work vehicle according to the first aspect of the present invention the work vehicle further comprising coupling means for allowing coupling to said agricultural work vehicle of an agricultural implement, said coupling means optionally being arranged at or on said connecting element, said coupling means optionally being in the form of a three-point hitch or in the form of an A-frame.

In an embodiment of the agricultural work vehicle according to the first aspect of the present invention the first drive module and said second drive module are having an elongate shape.

It has proved beneficial to design each drive module with an elongate shape having its longest dimension in the driving direction.

In an embodiment of the agricultural work vehicle according to the first aspect of the present invention the first axial end of said connecting element is attached to said first chassis of said first drive module at an end thereof; and wherein said second axial end of said connecting element is attached to said second chassis of said second drive module at an end thereof.

Hereby the connecting element will be arranged near an extreme end of the agricultural work vehicle.

In an embodiment of the agricultural work vehicle according to the first aspect of the present invention the first drive module and said second drive module are arranged essentially in a parallel orientation relative to each other.

In an embodiment of the agricultural work vehicle according to the first aspect of the present invention the first drive module and said second drive module are arranged relative to each other in such a way that a free space is being present between part of said first drive module and part of said second drive module.

Hereby is assured that there is providing room for an agricultural implement in the free space between the drive modules.

In an embodiment of the agricultural work vehicle according to the first aspect of the present invention the free space between the first drive module and the second drive module in a region appearing in a direction perpendicular to the connecting element, such as in a forward pointing direction and/or in a rearward pointing direction, is devoid from any element connecting said first drive module to said second drive module.

Hereby is assured that no fixed structure between the first and the second drive module prevents the pivoting of the pivoting means of the work vehicle.

In an embodiment of the agricultural work vehicle according to the first aspect of the present invention the pivoting means is arranged at or on said connecting element.

These locations have proven beneficial as will be evident from the description below.

In an embodiment of the agricultural work vehicle according to the first aspect of the present invention each drive means is being rigidly suspended at or on its corresponding chassis, i.e. in a non-spring-loaded manner.

By providing the pivoting means as defined according to the first aspect of the present invention, expenses for manufacturing spring-loaded suspensions of the drive means can be avoided altogether, thereby reducing manufacturing costs.

Alternatively, each drive means may be suspended at or on its corresponding chassis in a spring-loaded manner.

In an embodiment of the agricultural work vehicle according to the first aspect of the present invention the work vehicle comprises a monitoring unit for visually monitoring soil and/or vegetation during operation thereof.

Hereby the agricultural work vehicle according to the first aspect of the present invention can be used for surveying operations in an agricultural field.

In an embodiment of the agricultural work vehicle according to the first aspect of the present invention the work vehicle comprises means for allowing, during driving a curved trajectory, the outer drive means, such as the outer wheels, to rotate a higher angular velocity, compared to the inner drive means, such as the inner wheels.

Hereby a minimum degree of adverse physical impact is imposed to the soil.

In an embodiment of the agricultural work vehicle according to the first aspect of the present invention the pivoting means comprises a bracket; said bracket comprises a back surface and a front surface; wherein said back surface of said bracket is being fastened to said first chassis of said first drive module at a side thereof facing the second drive module;
wherein said bracket comprises an inner cylinder extending from the front surface of said bracket in a direction towards the second drive module;
wherein said bracket comprises a recess between said front surface and said back surface, said recess is defining a plane being essentially parallel to said back surface of said bracket;
wherein said first axial end of said connecting element comprises a flange extending from an outer surface of said connecting element;
wherein said flange of said connecting element is being accommodated in said recess of said bracket in such a way that said inner cylinder of said bracket is being accommodated in the interior of said connecting element.

This design provides a simple and sturdy design of the pivoting element which indeed is able to withstand the torsions forces encountered on the pivoting means during movement of the work vehicle in an agricultural field.

In an embodiment of this embodiment of the pivoting means the one or more bearings is/are being arranged between said inner cylinder of said bracket and an inner surface of said connecting element.

Hereby the bearing is shielded off from the dirty environment encountered in an agricultural field.

In an embodiment of the above embodiment of the pivoting means the bearing(s) is/are a roller bearing or a glide bearing, such as a metal or an alloy bearing, such as a bronze bearing; or a polymer bearing, such as a Teflon bearing; or a composite bearing, such as a carbon fiber bearing.

In an embodiment of the agricultural work vehicle according to the first aspect of the present invention the connecting element comprises a first part and a second part;
wherein said first part of said connecting element comprises a first axial end and a second axial end;
wherein said second part of said connecting element comprises a first axial end and a second axial end;
wherein said first axial end of said first part of said connecting element is being fixed to said first chassis of said first drive module;
wherein said second axial end of said second part of said connecting element is being fixed to said second chassis of said second drive module;
wherein said pivoting means comprises a bearing, said bearing comprises a first attachment part, and a second attachment part; said first attachment part is being pivotally suspended relative to said second attachment part;
wherein said second axial end of said first part of said connecting element is being fixed to said first attachment part of said bearing; and wherein said first axial end of said second part of said connecting element is being fixed to said second attachment part of said bearing.

Hereby is achieved that the bearing is being arranged on the connecting element at a position between the first drive module and the second drive module.

In an embodiment of the agricultural work vehicle according to the first aspect of the present invention the work vehicle further comprising an agricultural implement for performing an agricultural work operation.

In an embodiment of the agricultural work vehicle according to the first aspect of the present invention the agricultural implement is being selected from the group comprising: a tillage implement, a harrow, a seed drill, a cultivator, a weeder, a sprayer, a fertilizer, a spreader, an irrigator, a harvesting implement.

Hereby a vast array of various agricultural operations may be performed.

In an embodiment of the agricultural work vehicle according to the first aspect of the present invention the work vehicle further comprising a monitoring unit for monitoring the operation of said work vehicle.

Hereby can continuously be controlled whether or not the work vehicle and/or its attached implement operates is a desired mode.

In an embodiment of the agricultural work vehicle according to the first aspect of the present invention the control unit is being configured for receiving and storing information on a data storage, relating to one or more of the following: geographic coordinates relating to the boundary of an agricultural field to be worked; geographic coordinates relating to the boundary of one or more obstacles being present in an agricultural field to be worked; geographic coordinates relating to a preferred trajectory to be followed by said agricultural work vehicle; information relating to the effective working width of an agricultural implement to be carried/towed by said agricultural implement; information relating to the interrow distance between rows of crops in the agricultural field to be worked.

Hereby it is possible to instruct the work vehicle to follow a predetermined route on an agricultural field in a mode where the work vehicle operates in autonomously.

In an embodiment of the agricultural work vehicle according to the first aspect of the present invention the control unit comprises switching means for allowing an operator to switch between an autonomous working mode and/or a remotely controlled working mode and/or a semi-autonomous working mode of said agricultural work vehicle.

Hereby different modes of operations can be selected.

In an embodiment of the agricultural work vehicle according to the first aspect of the present invention the agricultural work vehicle comprises position indicating means, such as a GNSS (Global Navigation Satellite System) receiver, such as a GPS receiver for providing information relating to a geographical position of said vehicle.

In an embodiment of the agricultural work vehicle according to the first aspect of the present invention the control unit is configured to receive information from said position indicating means, relating to said geographical position of said work vehicle.

Hereby is assured that the control unit continuously gains information of the geographical position of the work vehicle.

In an embodiment of the agricultural work vehicle according to the first aspect of the present invention the control unit is being configured to provide instructions to said propulsion means and to said steering means of said work vehicle so as to make said work vehicle follow a desired trajectory on said agricultural field; wherein geographical coordinates of said desired trajectory is being or has been provided to said control unit.

Hereby an autonomous mode of operation is possible.

In an embodiment of the agricultural work vehicle according to the first aspect of the present invention the agricultural work vehicle comprises input means for programming said control unit, such as in the form of a receiver for wirelessly receiving information relating to a programming of said control unit.

Hereby the programming of the control system of the agricultural work vehicle can be performed conveniently.

In an embodiment of the agricultural work vehicle according to the first aspect of the present invention the agricultural work vehicle comprises a display, such as a monitor for displaying information relating to an operational state of said agricultural vehicle.

Hereby the operational state of the agricultural vehicle can be checked on site.

The Second Aspect of the Present Invention

In a second aspect the present invention relates to the use of an agricultural work vehicle according to the first aspect for performing an agricultural work operation.

In an embodiment of the use of the agricultural work vehicle according to the second aspect of the present invention the agricultural work operation is being selected from the group comprising: surveying of the agricultural field, tillaging soil, harrowing soil, seeding seeds into soil, cultivation of soil, weeding of soil, spraying, such as spraying of a herbicide or of a pesticide or of a fungicide, spreading of fertilizer, irrigation of the field with water, harvesting crops.

Referring now to the drawings for better illustrating the present invention, FIG. 1 is a perspective view illustrating an autonomous agricultural work vehicle according to the prior art. The agricultural work vehicle illustrated in FIG. 1 is the autonomous agricultural work vehicle marketed as Robotti and which has been mentioned in the introduction of this patent application.

FIG. 1 shows the prior art autonomous agricultural work vehicle 300 comprising a first drive module 2 and a second drive module 4. Each drive module comprises two wheels 24.

It is seen that the first drive module 2 is connected to the second drive module 4 by a connecting element 6 having a fixed length. The connecting element 6 carries coupling means 37 in the form of a three-point hitch for coupling an agricultural implement to the vehicle. The connecting element 6 is being rigidly fastened to the first module 2 at a first chassis 18 thereof. Likewise, the connecting element 6 is being rigidly fastened to the second module 4 at a second chassis 20 thereof.

As the connecting element 6 is being rigidly connected to the chassis 18,20 of the first and second drive module, respectively, and as each of the wheels 24 is also rigidly suspended on its corresponding chassis 18,20 it is clear that when the lowest point of each of the wheels collectively defines a plane, the prior art work vehicle may encounter ground terrain topologies which prevent one of the four wheels to stay in contact with the ground. This accordingly amount to reduced traction and increased soil compaction.

The present invention seeks to eliminate such problems.

These problems are solved by an agricultural work vehicle according to the present invention. Such an agricultural work vehicle is illustrated in FIG. 2a.

Figure 2A:
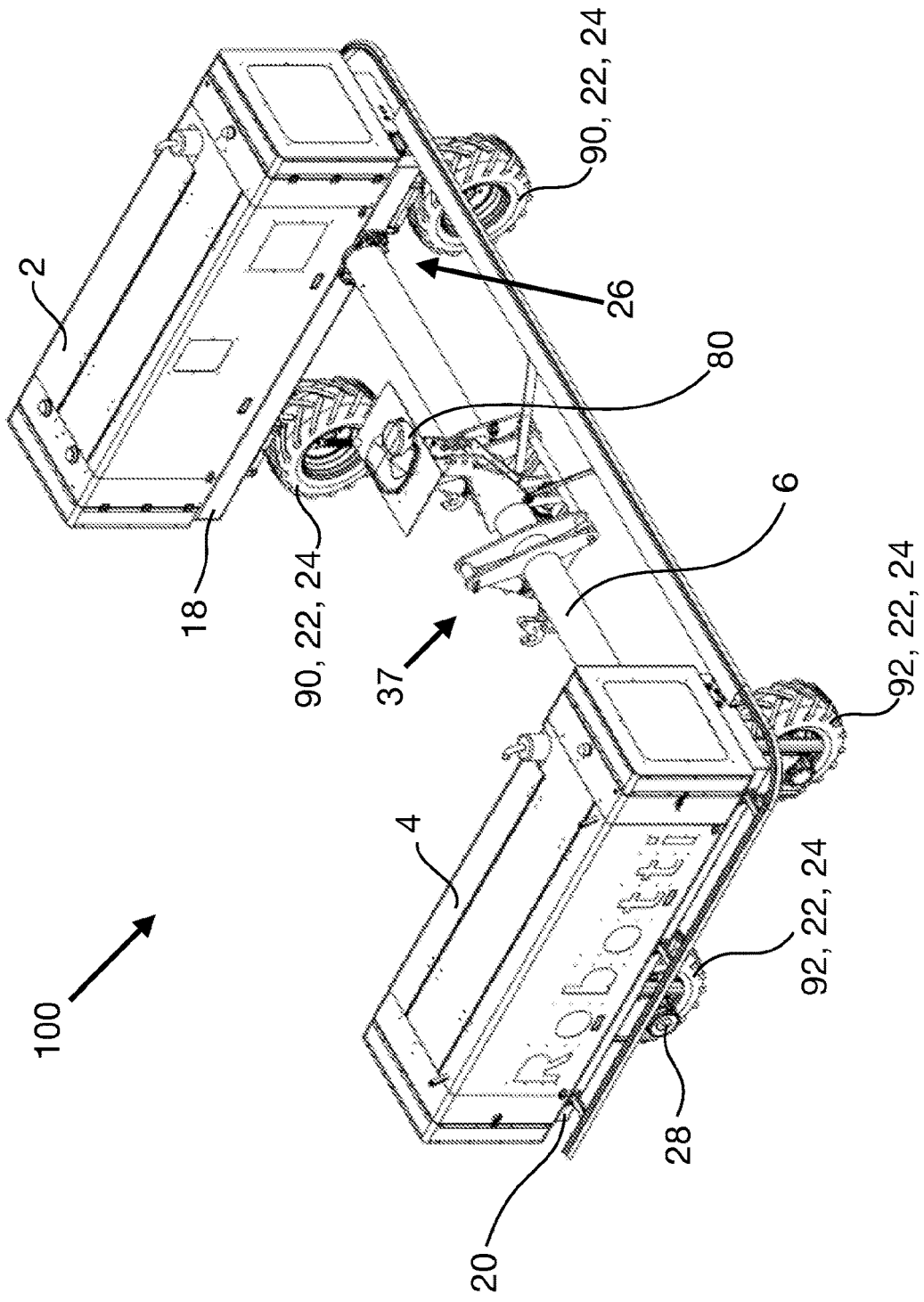
FIG. 2a is a perspective view illustrating an autonomous agricultural work vehicle according to the present invention.

FIG. 2a is a perspective view of an agricultural work vehicle 100 according to the present invention. The work vehicle 100 comprising a first drive module 2 and a second drive module 4. Each drive module comprises two drive means 90,92 in the form of wheels 24.

Again, it is seen that the first drive module 2 is connected to the second drive module 4 by a connecting element 6. The connecting element 6 carries coupling means 37 in the form of a three-point hitch for coupling an agricultural implement to the vehicle.

The inventive work vehicle 100 is provided with pivoting means 26 which allows that the orientation of said first drive module 2 is being able to rotate in relation to the orientation of said second drive module 4 around an axis being essentially parallel to said connecting element 6.

The pivoting means 26 is arranged at the first chassis 18 of the first drive module at a front end thereof.

Figure 2B:
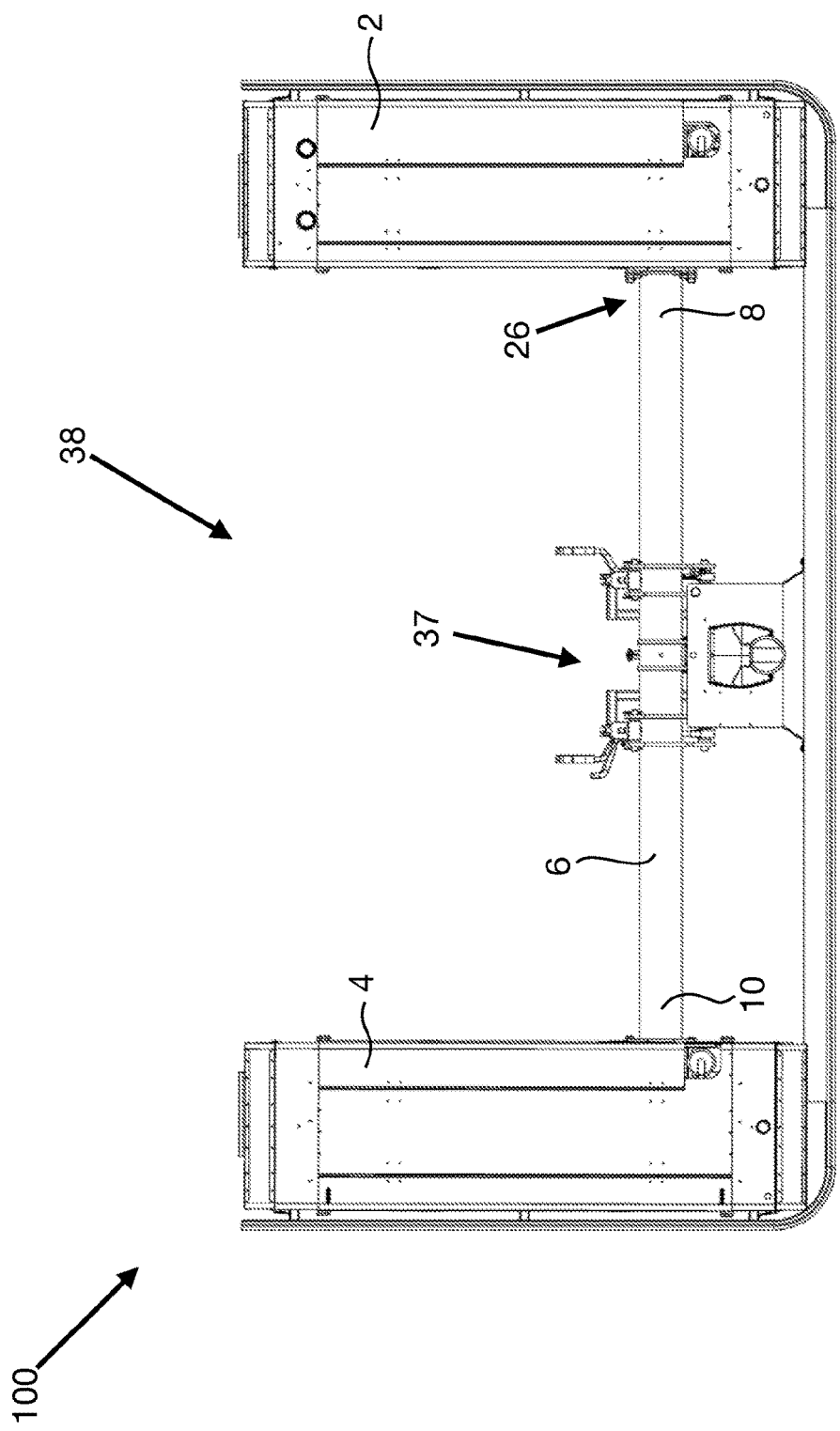
Figure 2C:
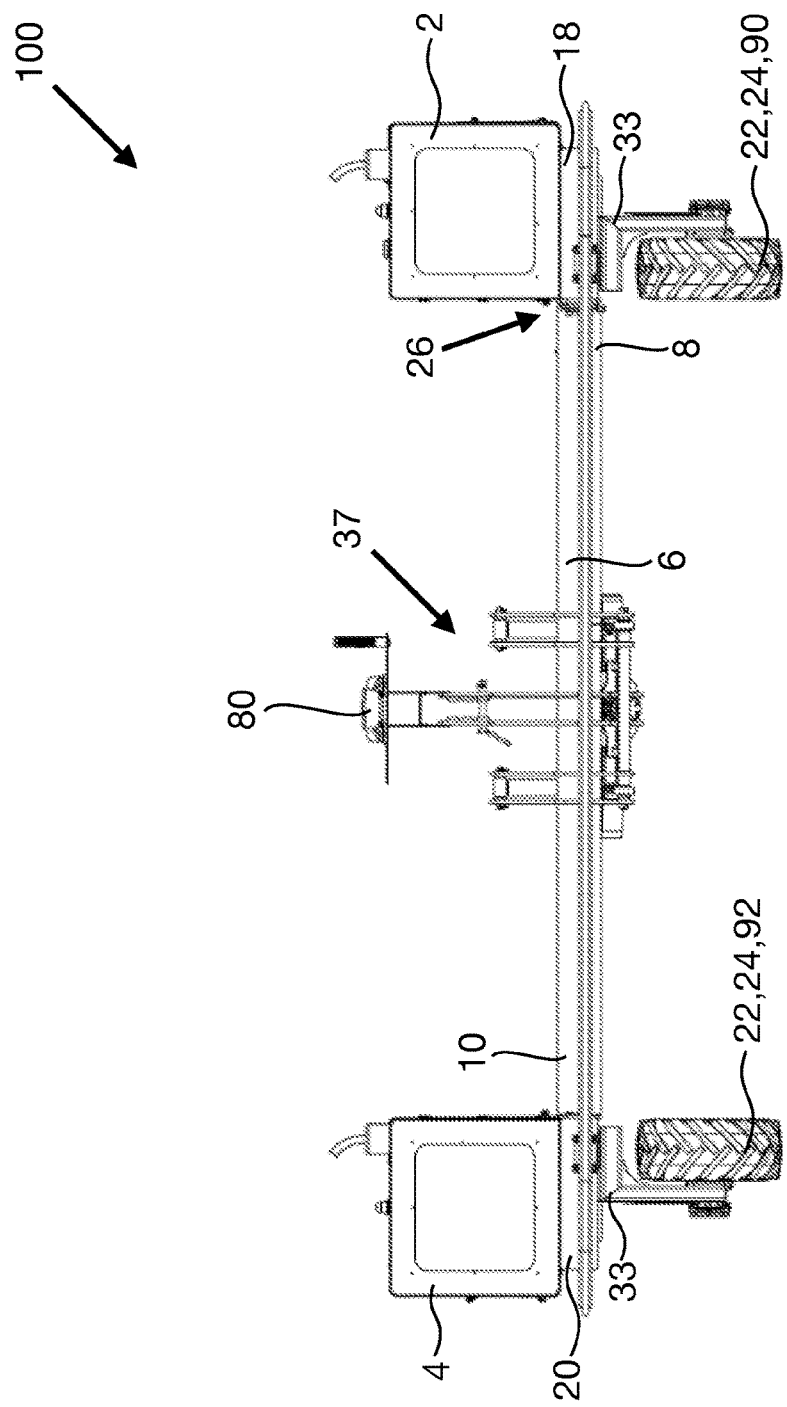

FIG. 2b is a top view illustrating the agricultural work vehicle shown in FIG. 2a and FIG. 2c is a front view thereof.

FIG. 2b shows that the connecting element 6 comprises a first axial end 8 and a second axial end 10.

FIG. 2c shows that the two front wheels 24 of the drive means 90,92 are suspended in a wheel base 33, each of which allows the alternation of the pitch of the rotational plane of each wheel, relative to a fixed geographical direction.

Figure 2D:
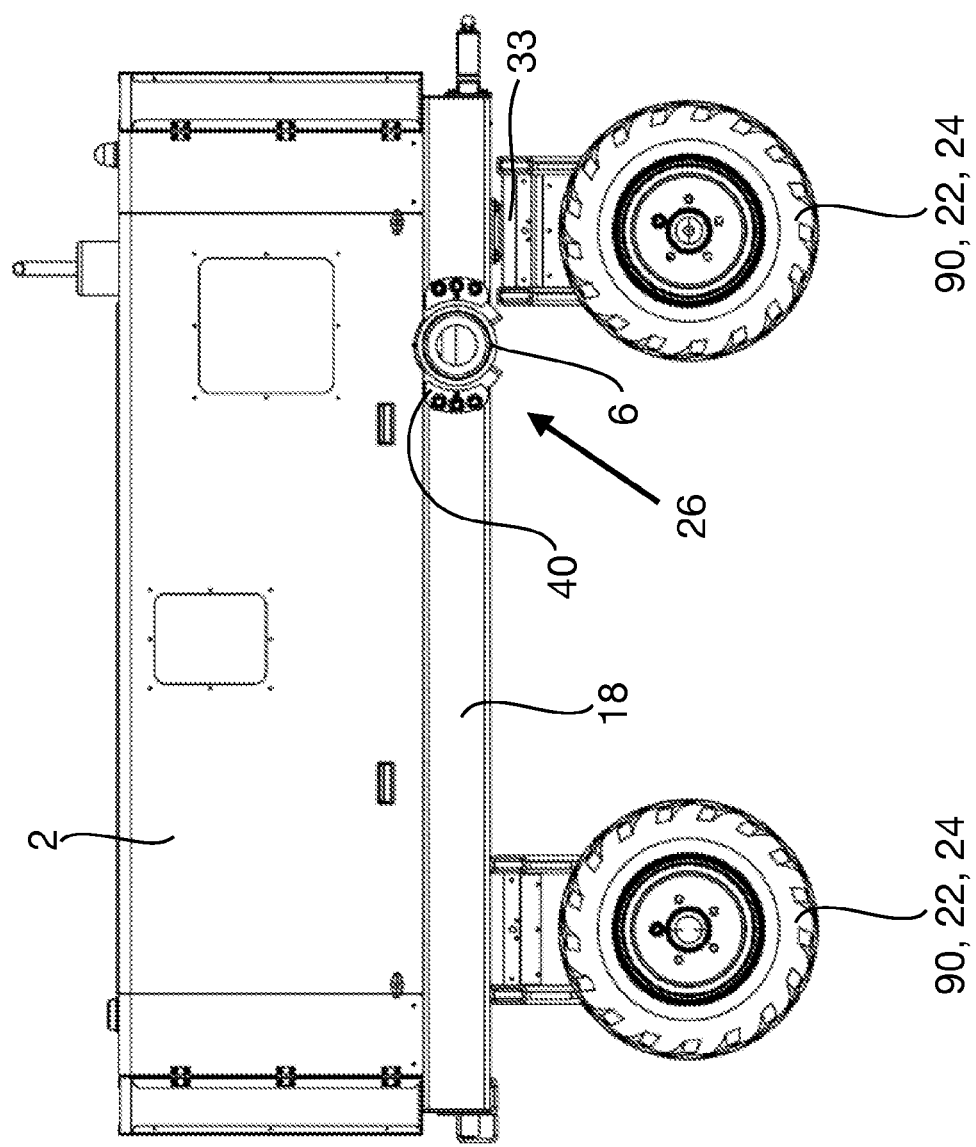

FIG. 2d is a cross-sectional view of the inventive agricultural work vehicle illustrated in FIG. 2a, cut along a longitudinal plane between the two drive modules 2,4.

In FIG. 2d it is seen that the pivoting means 26 comprises a bracket 40 which is fastened on the first chassis 18 of the first drive module 2. The connecting element 6 is being pivotally or rotationally mounted in this bracket. This is illustrated in further detail in FIG. 3.

Figure 2E:
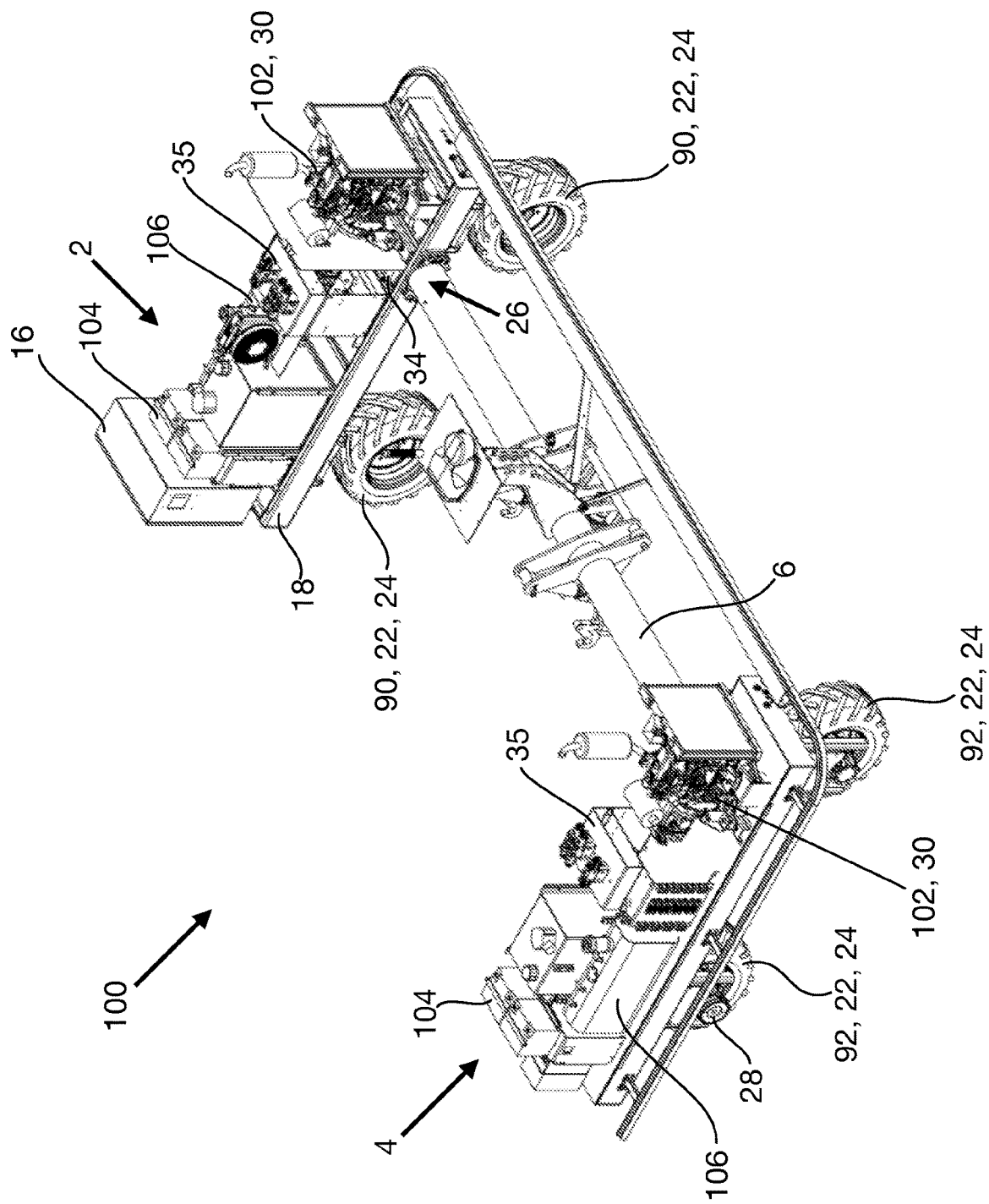
FIG. 2e is a perspective view illustrating an autonomous agricultural work vehicle according to the present invention showing details of the mechanics involved.

FIG. 2e is a perspective view illustrating the inventive agricultural work vehicle of FIG. 2a with the covers of the drive modules removed, thereby exposing details of the mechanics and hydraulics involved in the operation of the vehicle.

FIG. 2e shows that each drive unit 2,4 comprises its own diesel engine 102 for providing power for propelling the work vehicle. A hydraulic pump 30 is integrated with the engine. Associated herewith are also provided a diesel tank 106 and a battery 104.

Hydraulic valves 35 controls the actuation of hydraulic actuation means 34 for steering the work vehicle. A control unit 16 is also seen in FIG. 2e.

Figure 3:
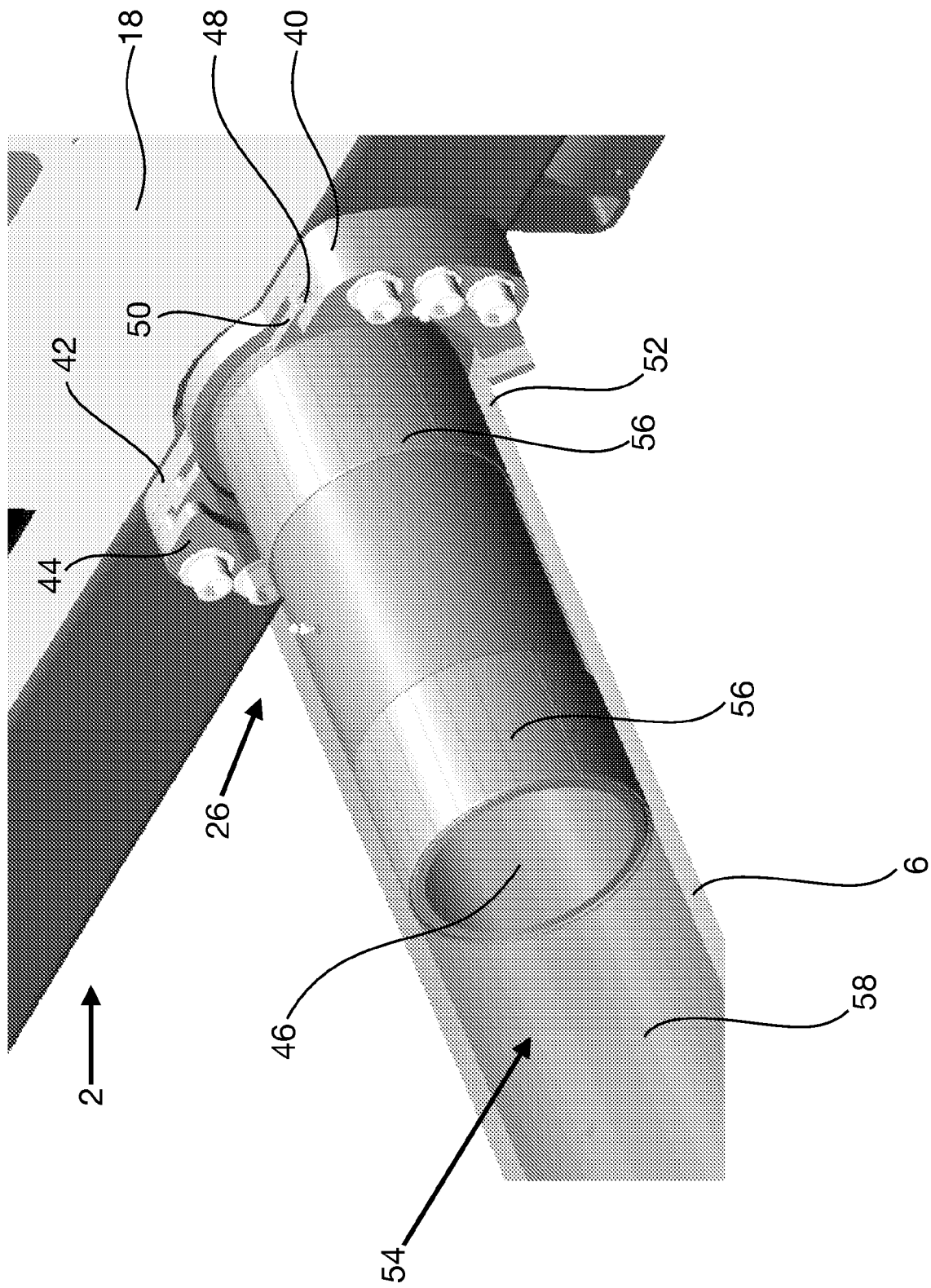
FIG. 3 is a partly see-through perspective view illustrating one embodiment of pivoting means employed in the present invention in order to allow the orientation of one drive module to pivot in relation the other drive module.

FIG. 3 is a partly see-through perspective view illustrating one embodiment of the pivoting means 26 employed in the present invention.

FIG. 3 shows the bracket 40 comprising a back surface 42 and a front surface 44. The back surface 44 of the bracket is being fastened to the first chassis 18 of the first drive module 2 at a side thereof facing the second drive module 4. The bracket 40 comprises an inner cylinder 46 extending from the front surface 44 of said bracket 40 in a direction towards the second drive module 4.

It is seen that the bracket 40 comprises a recess 48 between the front surface 44 and the back surface 42 of the bracket. The recess 48 is defining a plane which is being essentially parallel to the back surface 42 of the bracket.

It is also seen in FIG. 3 that the first axial end 8 of the connecting element 6 comprises a flange 50 extending from an outer surface 52 of the connecting element 6, and it is seen that the flange 50 is being accommodated in the recess 48 of the bracket 40 in such a way that the inner cylinder 46 of the bracket is being accommodated in the interior 54 of the connecting element 6.

Hereby the orientation of the first drive module 2 is able to rotate in relation to the orientation of the second drive module 4, around an axis which is being essentially parallel to a longitudinal direction of the connecting element 6.

Figure 4:
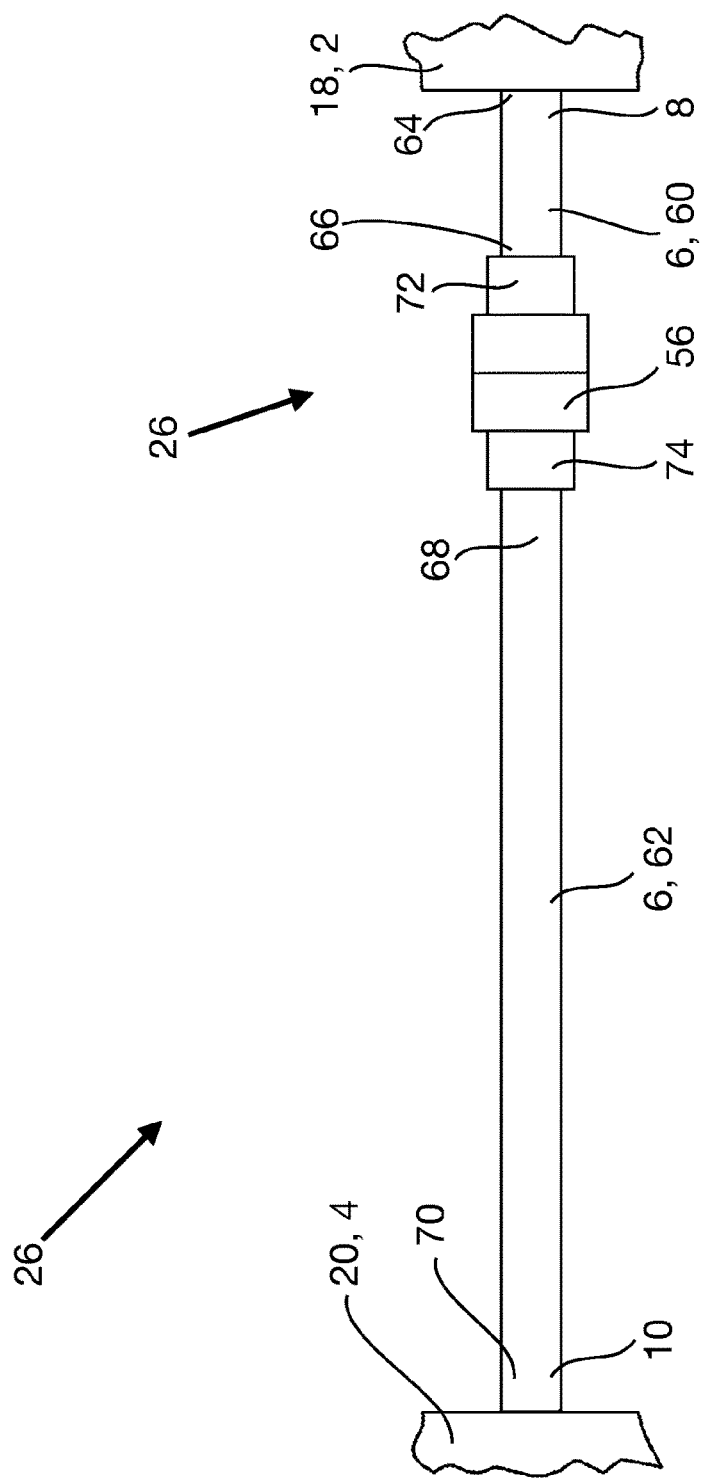
FIG. 4 is a plan view illustrating another embodiment of pivoting means employed in the present invention in order to allow the orientation of one drive module to pivot in relation the other drive module.

FIG. 4 is a plan view illustrating another embodiment of pivoting means employed in the agricultural work vehicle.

FIG. 4 shows that pivoting means 26 comprising a bearing 56 arranged on the connecting element 6 between the first axial end 8 and the second axial end 10 thereof.

Thereby the connecting element 6 comprises a first part 60 and a second part 62.

The first part 60 of the connecting element 6 comprises a first axial end 64 and a second axial end 66, and the second part 62 of the connecting element 6 comprises a first axial end 68 and a second axial end 70.

The first axial end 64 of the first part 60 of the connecting element 6 is being fixed to the first chassis 18 of the first drive module 2. The second axial end 70 of said second part 62 of the connecting element 6 is being fixed to the second chassis 20 of the second drive module 4.

The bearing 56 of the pivoting means 26 comprises a first attachment part 72 and a second attachment part 74, wherein the first attachment part 72 is being pivotally suspended relative to said second attachment part 74 in the bearing 56.

The second axial end 66 of the first part 60 of said connecting element is being fixed to the first attachment part 72 of the bearing 56; and the first axial end 68 of the second part 62 of the connecting element 6 is being fixed to the second attachment part 74 of the bearing 56.

Hereby, the bearing is being arranged on the connecting element 6 at a position between the first drive module 2 and the second drive module 4.

Accordingly, with the arrangement illustrated in FIG. 4, the orientation of the drive module 2 is able to pivot or rotate in relation to the orientation of the second drive module 4, around an axis which is being essentially parallel to the longitudinal direction of the connecting element 6.

Figure 5:
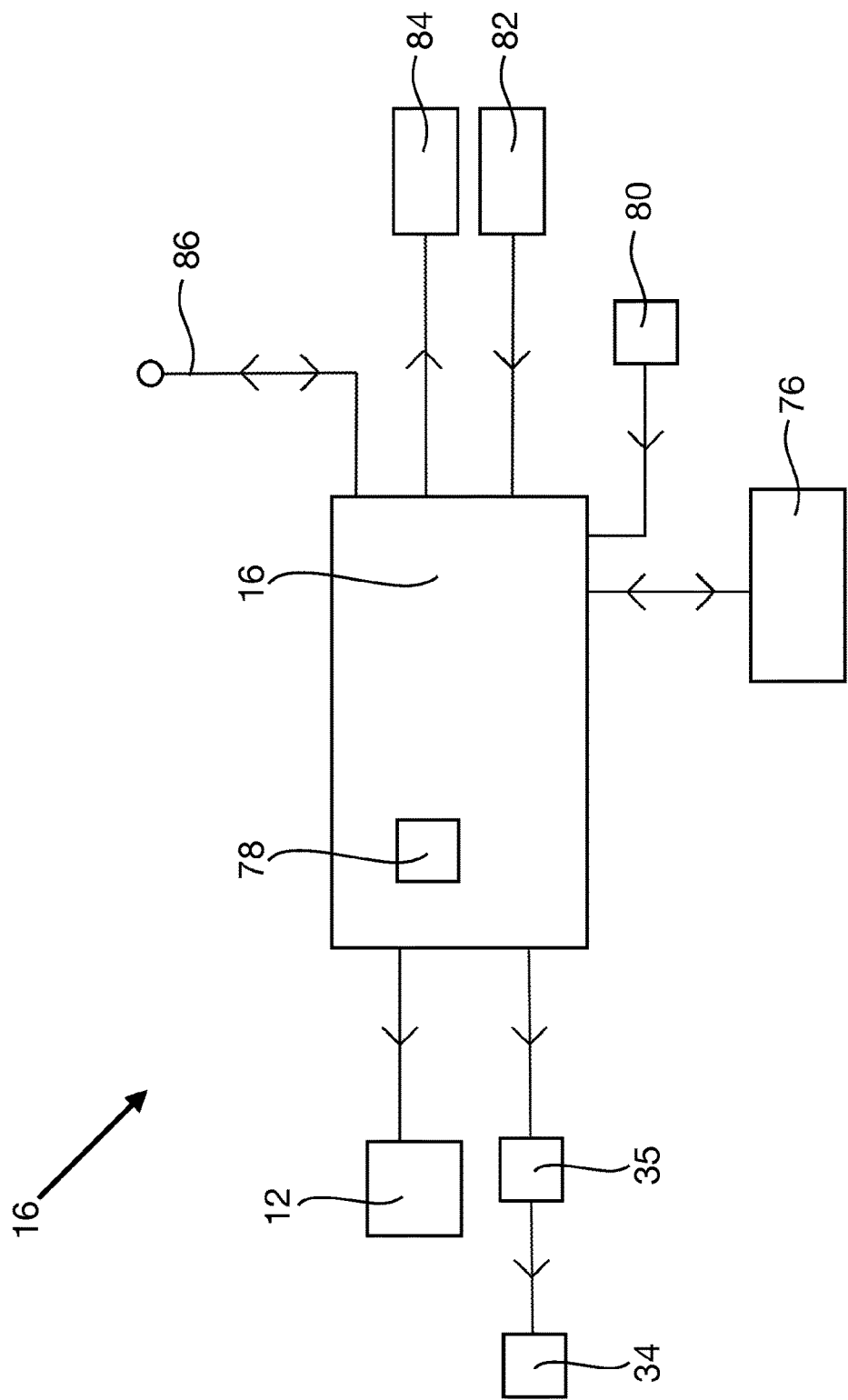
FIG. 5 is a schematic diagram illustrating the principle of the working mode of the control unit of the agricultural work vehicle of the present invention.

FIG. 5 is a diagrammatic illustration illustrating the working mode of the control unit of the agricultural working unit of the present invention.

FIG. 5 shows that control unit 16 which is being connected to a input means 82. The input means allows for programming or setting the desired operation of the agricultural work vehicle 100. A display 84 allows for monitoring the setting and the operational state of the agricultural work vehicle. Alternative to the input means 82 the control unit may also be programmed or may receive information relating to desired settings by means of the receiver 86 for receiving electromagnetic signals.

FIG. 5 also shows that the control unit is coupled to a position indicating receiver 80 which is configured for providing to the control unit information relating to a current geographical position of the agricultural work vehicle 100.

A data storage 76 is provided for storing data relating to the operation of the agricultural vehicle, such as data relating to geographical coordinates of a desired trajectory to be followed during working of an agricultural field.

A switch 78 is provided for allowing switching the operational mode between an autonomous working mode, a manually controlled working mode, such as a remotely controlled mode or a semi-autonomous working mode. The switch 78 may also be actuated wirelessly by means of the receiver 86.

The control unit 16 is configured for providing signals to the propulsion means 12 relating to controlling the propulsion of the vehicle.

Moreover, the control unit 16 is configured for providing signals to a hydraulic valve 35 which in turn provides for supplying hydraulic fluid to the hydraulic actuator 34 which is responsible for actuating the wheel bases 33 so as to turn these with the view to steer the agricultural work vehicle.

Accordingly, in an autonomous working mode, the control unit has been supplied, via the input means 82 or the receiver 86, with information relating to a desired trajectory to be followed by the work vehicle when working an agricultural field. The position indicating means 80 will constantly provide information to the control unit relating to the geographical position of the work vehicle. Based on this information and based on the desired trajectory to be followed, the control unit will constantly provide propulsion information and steering information, respectively, to the propulsion means 12 and to the hydraulic valve 35, respectively, with the view to safely and efficiently make the agricultural work vehicle follow a desired path on the agricultural field during working thereof.

It should be understood that all features and achievements discussed above and in the appended claims in relation to one aspect of the present invention and embodiments thereof apply equally well to the other aspects of the present invention and embodiments thereof.

LIST OF REFERENCE NUMERALS

2 First drive module
4 Second drive module
6 Connecting element

8 First axial end of connecting element
10 Second axial end of connecting element
12 Propulsion means
14 Steering means
16 Control unit
18 First chassis
20 Second chassis
22 Set of wheels
24 Wheel
26 Pivoting means
28 Hydraulic drive
30 Hydraulic pump
32 Motor for driving hydraulic pump
33 Wheel base
34 Actuation means of steering means
35 Hydraulic valve
36 Energy storage or energy provider
37 Coupling means
38 Free space
40 Bracket
42 Back surface of bracket
44 Front surface of bracket
46 Inner cylinder
48 Recess
48 Flange of connecting element
50 Outer surface of connecting element
52 Interior of connecting element
54 Bearing
58 Inner surface of connecting element
60 First part of connecting element
62 Second part of connecting element
64 First axial end of first part of connecting element
66 Second axial end of first part of connecting element
68 First axial end of second part of connecting element
70 Second axial end of second part of connecting element
72 First attachment part of bearing
74 Second attachment part of bearing
76 Data storage
78 Switching means
80 Position indicating means
82 Input means
84 Display
86 Receiver for electromagnetic signals
90, 92 Drive means
100 Agricultural work vehicle according to the invention
102 Diesel engine
104 Battery
106 Diesel tank
300 Prior art agricultural work vehicle

The invention claimed is:

1. An agricultural work vehicle (100) for performing an agricultural work operation in an agricultural field, the work vehicle comprising:
a first drive module (2) comprising a first chassis (18) and a first drive means (90) for allowing the first drive module to move over ground, wherein the first drive means is suspended on the first chassis;
a second drive module (4) comprising a second chassis (20) and a second drive means (92) for allowing the second drive module to move over ground, wherein the second drive means is suspended on the second chassis;
a connecting element (6) comprising a first axial end (8) attached to the first chassis and a second axial end (10) connected to the second chassis;
a propulsion means (12) for propelling the work vehicle;
a steering means (14) for steering the work vehicle;
a control unit (16) for controlling the operation of said work vehicle; and
a pivoting means (26) allowing an orientation of the first drive module to freely rotate in relation to the orientation of the second drive module around an axis, the axis being essentially parallel to a longitudinal direction of the connecting element.

2. The agricultural work vehicle (100) of claim 1, wherein the agricultural work vehicle is one of a remotely controlled work vehicle, an autonomous work vehicle and a semi-autonomous work vehicle.

3. The agricultural work vehicle (100) of claim 1, wherein the propulsion means (12) comprises at least one electric motor or at least one hydraulic drive (28) or at least one mechanical drive for driving the first and second drive means.

4. The agricultural work vehicle (100) of claim 1, wherein each of the first and second drive means (90,92) comprises at least two sets of wheels, wherein all wheels in a specific set of wheels share a common axis of rotation, or each of the first and second drive means comprise at least one caterpillar belts.

5. The agricultural work vehicle (100) of claim 4, wherein each of the first and second drive means (90,92) comprise two sets (22) of wheels (24), the sets of wheels being arranged behind each other relative to a non-turning direction of movement of the vehicle, or wherein each of the first and second drive means (90,92) comprise at least two caterpillar belts arranged sideways to each other and/or behind each other.

6. The agricultural work vehicle (100) of claim 1, wherein at least one set (22) of wheels (24) of each drive module (2,4) is pivotally suspended in a wheel base (34) on its corresponding chassis (18,20) wherein a pitch of rotational plane of one or more wheels (24) of a set (22) of wheels is alterable relative to a fixed geographical direction, and wherein the steering means (14) comprises actuation means (34) for altering the pitch and wherein the steering means (14) comprises means for allowing propelled wheels (24) of one drive module (2,4) to rotate at a rotational speed different from a rotational speed of the propelled wheels (24) of the other drive module (4,2).

7. The agricultural work vehicle (100) of claim 1 further comprising a coupling means (37) for coupling an agricultural implement to the work vehicle, wherein the coupling means is arranged at or on the connecting element (6) and is in the form of a three-point hitch or in the form of an A frame.

8. The agricultural work vehicle (100) of claim 1, wherein the first drive module (2) and the second drive module (4) have an elongate shape and are being arranged in a parallel orientation relative to each other.

9. The agricultural work vehicle (100) of claim 1, wherein the first axial end (8) of the connecting element (6) is attached to the first chassis (18) of the first drive module (2) at an end thereof; and
the second axial end (10) of the connecting element (6) is attached to the second chassis (20) of the second drive module (4) at an end thereof.

10. The agricultural work vehicle (100) of claim 1, wherein the first drive module (2) and the second drive module (4) are arranged relative to each other with a free space (38) being present between a part of the first drive module (2) and a part of the second drive module (4).

11. The agricultural work vehicle (100) of claim 1, wherein a free space (38) in a region appearing in a direction perpendicular to the connecting element (6) is devoid from any element connecting the first drive module (2) to the second drive module (4).

12. The agricultural work vehicle (100) of claim 1, wherein the pivoting means (26) is arranged at or on the connecting element (6).

13. The agricultural work vehicle (100) of claim 1 further comprising at least one of:
 a monitoring unit for visually monitoring soil and/or vegetation during operation;
 input means (82) for programming a control unit (16);
 a display (84) for displaying information relating to an operational state of the agricultural vehicle; and
 position indicating means (80) for providing information relating to a geographical position of the vehicle wherein the control unit (16) is configured to receive information from the position indicating means (80) relating to the geographical position of the work vehicle.

14. The agricultural work vehicle (100) of claim 1, wherein the pivoting means (26) comprises a bracket (40) having a back surface (42) and a front surface (44) wherein the back surface (42) is fastened to the first chassis (18) of the first drive module (2) at a side thereof facing the second drive module (4), wherein the bracket (40) comprises:
 an inner cylinder (46) extending from the front surface (44) towards the second drive module (4); and
 a recess (48) between the front surface (44) and the back surface (42), the recess defining a plane being parallel to the back surface (42) of the bracket wherein
  the first axial end (8) comprises a flange (50) extending from an outer surface (52) of the connecting element (6);
  the flange (50) being accommodated in the recess (48) wherein the inner cylinder (46) is accommodated in an interior (54) of the connecting element (6) with one or more bearings (56) being arranged between the inner cylinder (46) and an inner surface (58) of the connecting element (6).

15. The agricultural work vehicle (100) of claim 1, wherein the connecting element (6) comprises a first part (60) and a second part (62) wherein:
 the first part (60) comprises a first axial end (64) and a second axial end (66) and the second part (62) comprises a first axial end (68) and a second axial end (70), wherein the first axial end (64) of the first part is fixed to the first chassis (18) of the first drive module (2);
 the second axial end (70) of the second part is fixed to the second chassis (20) of the second drive module (4);
 the pivoting means (26) comprises a bearing (56), the bearing comprising a first attachment part (72) and a second attachment part (74) with the first attachment part (72) being pivotally suspended relative to the second attachment part (74);
 the second axial end (66) of the first part (60) is fixed to the first attachment part (72) of the bearing (56); and
 the first axial end (68) of the second part (62) is fixed to the second attachment part (74);
 the bearing thereby being arranged on the connecting element (6) at a position between the first drive module (2) and the second drive module (4).

16. The agricultural work vehicle (100) of claim 1 further comprising an agricultural implement for performing an agricultural work operation, the agricultural implement being selected from a group comprising: a tillage implement, a harrow, a seed drill, a cultivator, a weeder, a sprayer, a spreader, an irrigator and a harvesting implement.

17. The agricultural work vehicle (100) of claim 1 wherein the control unit (16) is configured for receiving and storing information on a data storage (76), the information relating to one or more of:
 geographic coordinates relating to a boundary of an agricultural field to be worked;
 geographic coordinates relating to a boundary of one or more obstacles being present in the agricultural field to be worked;
 geographic coordinates relating to a preferred trajectory to be followed by the agricultural work vehicle;
 information relating to an effective working width of an agricultural implement to be carried/towed by the agricultural implement; and
 information relating to an interrow distance between rows of crops in the agricultural field to be worked.

18. The agricultural work vehicle (100) of claim 1, wherein the control unit (16) comprises switching means (78) for allowing an operator to switch between an autonomous working mode and/or a remotely controlled working mode and/or a semi-autonomous working mode of the agricultural work vehicle (100).

19. The agricultural work vehicle (100) of claim 1, wherein the control unit (16) is configured to provide instructions to the propulsion means (12) and to the steering means (14) of the work vehicle so as to make the work vehicle follow a desired trajectory on the agricultural field; wherein geographical coordinates of a desired trajectory is being provided to the control unit (16).

20. Use of an agricultural work vehicle (100) according to claim 1 for performing an agricultural work operation.

* * * * *